Aug. 22, 1961   R. A. N. TRAFFORD   2,996,790
METHODS OF MANUFACTURING HOLLOW ARTICLES
Filed Aug. 22, 1957   3 Sheets-Sheet 1

INVENTOR
RICHARD ALFRED NORMAN TRAFFORD
BY
ATTORNEYS

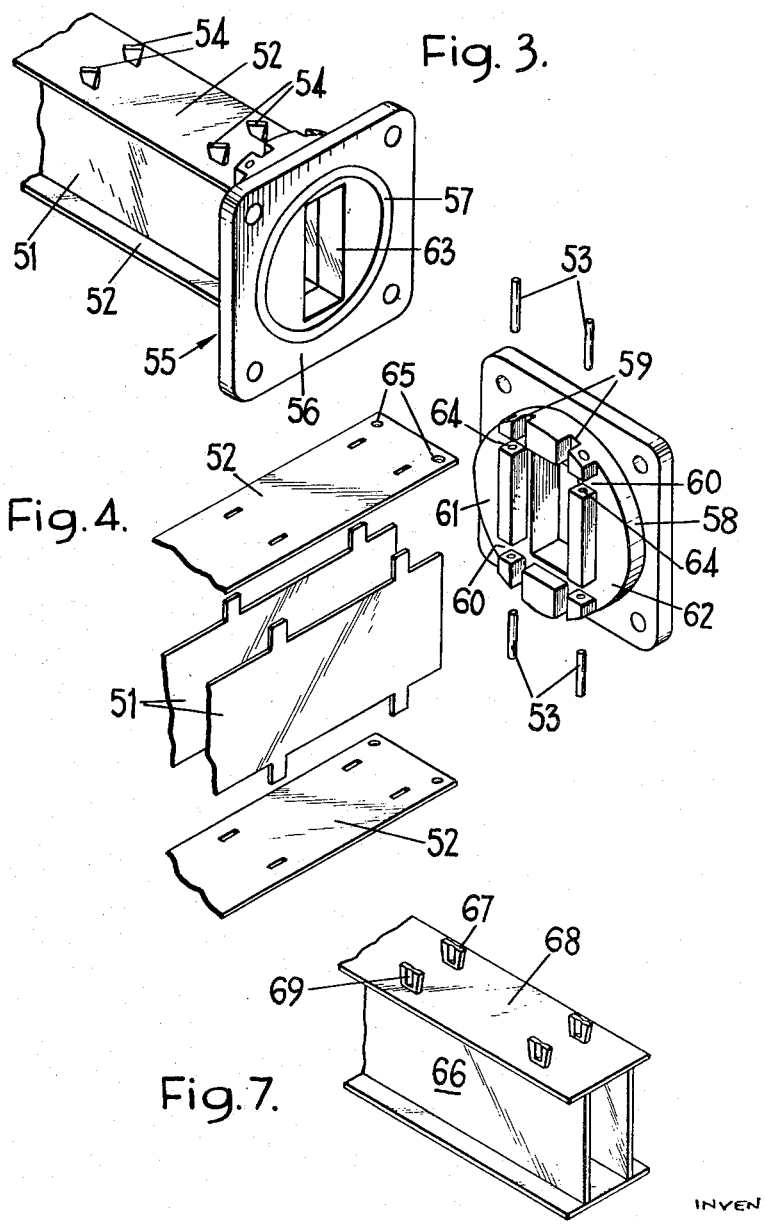

Aug. 22, 1961   R. A. N. TRAFFORD   2,996,790
METHODS OF MANUFACTURING HOLLOW ARTICLES
Filed Aug. 22, 1957   3 Sheets-Sheet 3

INVENTOR
RICHARD ALFRED NORMAN TRAFFORD
ATTORNEYS

United States Patent Office 2,996,790
Patented Aug. 22, 1961

2,996,790
METHODS OF MANUFACTURING
HOLLOW ARTICLES
Richard Alfred Norman Trafford, Hatch End, England, assignor to The General Electric Company Limited, London, England
Filed Aug. 22, 1957, Ser. No. 679,577
Claims priority, application Great Britain Aug. 23, 1956
10 Claims. (Cl. 29—155.5)

This invention relates to methods of manufacturing hollow articles. More particularly, but not exclusively, the invention relates to methods of manufacturing waveguides and wave-guide components and is also concerned with waveguides and waveguide components manufactured by such methods.

Waveguides are a well known type of electric transmission line and, throughout the present specification, the term "waveguide" is used in its normally accepted sense. It does not, therefore, include that type of transmission line sometimes known as a "wire waveguide" or a surface wave transmission line along which energy is transmitted by way of electric and magnetic fields surrounding an electric conductor or conducting surface.

The simplest form of waveguide consists of a length of metal tube which may be of square or rectangular cross-section. Frequently, however, it is required that a waveguide shall not be straight, for example if it contains a corner or bend, and it is a matter of some difficulty to manufacture such a waveguide from a straight length of tubing without changing the cross-section of the tube and thereby affecting the electrical properties of the resulting waveguide. It is also difficult, using standard workshop techniques, to manufacture certain waveguide components, such as waveguide couplers and other waveguide junctions, that include one or more waveguides. It is one object of the present invention to provide a relatively simple method of manufacturing such waveguides or waveguide components.

According to the present invention, in a method of manufacturing a hollow article, there are the steps of fitting together a plurality of metal members, bending, twisting or deforming portions of at least some of said members so that the members are locked together, and then joining together contiguous members of the said plurality to form a unitary structure.

The said contiguous members may be joined together to form the unitary structure by welding, soldering or brazing.

According to a feature of the present invention, a method of manufacturing a waveguide or waveguide component comprises the steps of fitting together a plurality of metal members, at least some of which are of material having a base of a first metal or alloy and a coating on one or both sides of the base of a second metal or alloy (which has a lower melting point than the first metal or alloy) so that portions of each of at least some of the members project through and/or beyond another member or members, bending, twisting or deforming at least some of the said members so that the said members are locked together, and immersing the structure which is formed, at least in part, by the said members that are locked together in a bath of brazing flux so as to cause the second metal or alloy to flow and thereby braze together at least the said metal members.

The said metal members that are locked together may constitute the entire structure that is immersed in the bath of brazing flux although the structure that is brazed may be formed by securing one or more additional metal members, for example by screwing, to the metal members that are locked together.

Preferably the said material has a base of aluminium or an aluminium alloy and a coating on one or both sides of the base of an aluminium-silicon alloy. It is to be understood that the wording used in the last paragraph but one is intended to include arrangements in which some of the members of the said material have the coating on both sides while other members only have the coating on one side.

Four examples of the manufacture of waveguides and waveguide components in accordance with the present invention will now be described with reference to the seven figures of the accompanying drawings in which FIGURE 1 shows an isometric view of a waveguide coupler which is of the kind known as a "long slot" coupler and which is manufactured by the first example;

FIGURES 3 and 4 show different isometric views of a waveguide and flange manufactured by the second example; FIGURE 4 being an exploded view;

FIGURE 7 shows an isometric view of a waveguide manufactured by the fourth example.

Figure 1:
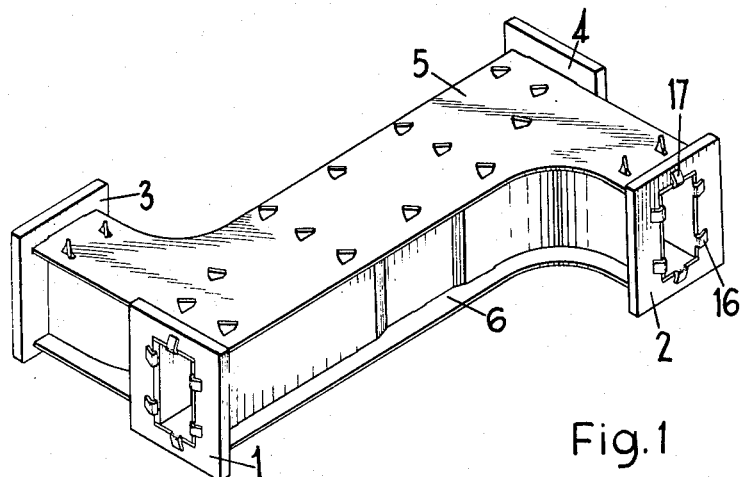

The waveguide coupler of FIGURE 1 comprises two lengths of waveguide, one length terminating at the flanges 1 and 2 while the other length terminates at the flanges 3 and 4. Two coupling slots are provided between the two waveguides in a manner which will be apparent hereinafter so as to enable energy in either one of the two waveguides to be coupled into the other waveguide.

Figure 2:
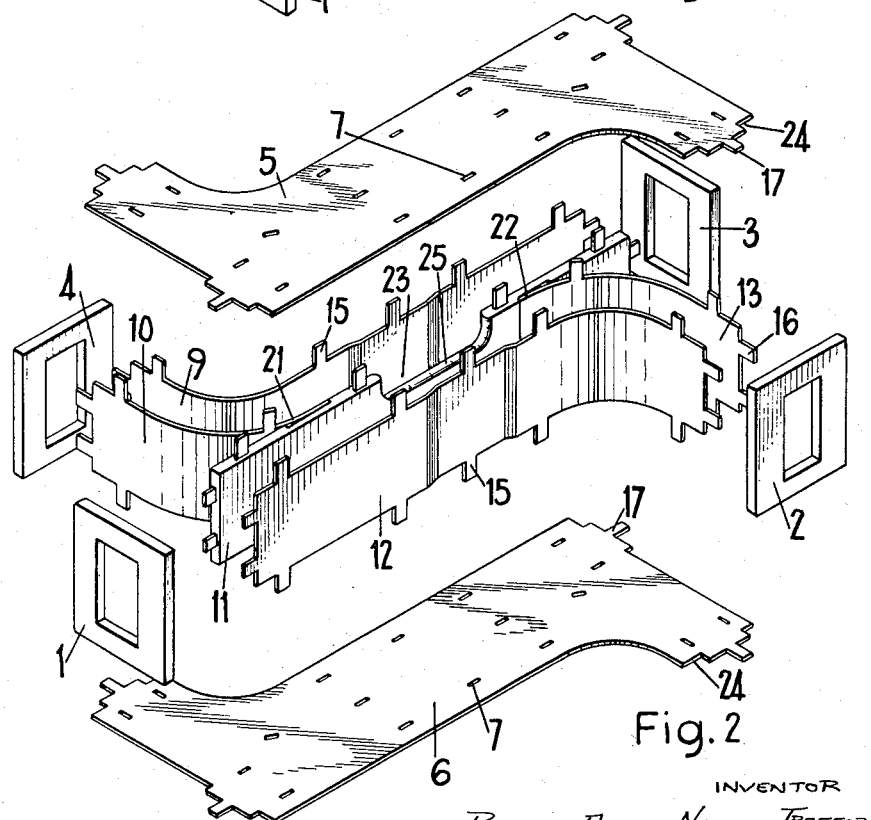
FIGURE 2 shows an exploded view of the waveguide coupler of FIGURE 1.

The various members from which the waveguide coupler is manufactured are shown in more detail in FIGURE 2. The top and bottom members 5 and 6 are provided with a plurality of holes 7 and the side members 9 to 13 are provided with tags 15 which are suitably located to pass through the holes 7 in the members 5 and 6 when the members are assembled and end tags 16. The members 5 and 6 are also provided with tags 17.

The members 5, 6, 9, 10, 12 and 13 are formed from sheet metal consisting of a base of aluminium-manganese which is coated on both sides with an aluminium-silicon alloy. These members are preferably of the material which is sold by Imperial Chemical Industries Ltd. under the trade name "Kynal" with the Code No. 1B 16/19 and which has an overall thickness of .036 inch. Alternatively the base may be an aluminium-magnesium-silicon alloy; a material having this base and an aluminium-silicon alloy coating being sold as "Kynal" Code No. 1B 16/39. The member 11 is of commercially pure aluminium having a thickness of 0.1 inch and is recessed at the points 21 and 22 so as to receive the members 10 and 13. The member 11 also has two cut-away portions of which only the portion 23 can be seen in FIGURE 2, these two portions constituting the previously mentioned slots in the complete waveguide coupler. The edges, such as the edge 25, of these cut-away portions are of semi-circular cross-section. The four flange members 1 to 4 are of aluminium-manganese alloy or aluminium-magnesium-silicon alloy and have a thickness of ⅛ inch.

The members 5 and 6 are stamped out from sheet material, and the holes 7 and the tags 17 may all be formed in a single stamping operation or in a number of successive operations. The members 9, 10, 12 and 13 are similarly stamped out from sheet material and then bent to the desired shapes as shown in FIGURE 2. The members 5, 6 and 9 to 13 are assembled so that the various tags 15 project through the appropriate holes 7 in the members 5 and 6. The flange members 1 to 4 are then placed in position, the flange member 2 for example being pushed over the ends of the members 5, 6, 12 and 13.

The various tags 15 projecting through the holes 7 in the members 5 and 6 are then each twisted through approximately 45° so as to lock together the members 5, 6 and 9 to 13. Moreover, all the tags 16 and 17 are bent over in the manner shown in FIGURE 1 so as to hold the flange members 1 to 4 in position, the flange member 2 for example being held between six such tags and the shoulder 24 of each of the members 5 and 6.

The resulting structure which is substantially as shown in FIGURE 1 is then cleaned in known manner. This may be done by first dipping the structure in an alkaline bath, for example an aqueous solution of sodium hydroxide, rinsing in water, and then dipping in an acid bath, for example dilute nitric acid, to remove any remaining traces of alkali and any copper that may be present. If the structure, as assembled, is clean, chemical cleaning may be replaced by a degreasing treatment in a suitable vapour such as trichlorethylene.

After cleaning, the structure is preheated in an oven for about 15 minutes to a temperature of approximately 540° C. The structure is then taken quickly from this oven and plunged into a bath of molten "Kynal" brazing flux. This causes the aluminium-silicon coating of the members 5, 6, 9, 10, 12 and 13 to flow with the result that when the structure is removed from the bath all the contiguous members 1 to 6 and 9 to 13 are brazed together.

The bath of "Kynal" brazing flux is maintained at a temperature in the range 580° C. to 640° C. and the period of immersion is between 15 seconds and 4 minutes but it is to be understood that the temperature and period are dependent on one another and on the particular structure to be brazed. To assist brazing, a small piece of brazing metal may be placed behind each of the bent-over tags 16 and 17 before the structure is placed in the brazing bath.

The method of brazing described above forms the subject of United States Patent No. 2,258,681.

The resulting structure is then cleaned in known manner to remove any remaining brazing flux. This may be done by washing in boiling water to dissolve away most of the flux and then dipping the structure in an acid bath, for example dilute nitric acid. After rinsing the structure is inspected for residual flux and if necessary the previous steps are repeated.

After brazing, the twisted tags 15 projecting through the members 5 and 6 may be removed, for example by being twisted off, while the bent-over tags 16 and 17 may be machined off so as to leave a flush surface to each of the flange members 1 to 4.

It is well known that the surface of a flange of a waveguide component which is adapted to be clamped to the flange of another component or waveguide during use may be provided with a choke in the form of an annular ditch in that surface, the ditch embracing the waveguide. A waveguide manufactured in accordance with the present invention may be provided with such a flange in place of the form of flange, such as the flange 2, in the example described above with reference to FIGURES 1 and 2. Thus referring now to FIGURES 3 and 4, the four members 51 and 52 which make up the waveguide itself are locked together by twisting tags such as the tag 54 as in the previous example.

In this case the flange member 55 is formed by a portion 56 which provides the flange itself in the finished waveguide and which is approximately square and has the required annular ditch 57 in one surface thereof and a circular portion 58 which is integral with the flange portion 56.

Slots 59 and 60 are milled across the annular portion 58 corresponding one to each waveguide wall but of rather greater width, the depth of each of these slots 59 and 60 being carefully controlled. Side portions 61 and 62 of the circular portion 58 are also cut away.

The rectangular hole 63 which passes through the member 55 is somewhat smaller than previously, the cross-sectional dimensions being the same as the internal dimensions of the finished waveguide. The slots 59 and 60 are so positioned that each overlaps one side of the hole 63.

In this example the members 51 and 52, which make up the waveguide have no end tags corresponding to the tags 16 and 17 in FIGURE 2 and the flange member 55 is placed in position so that the end of each of the waveguide members 51 and 52 bears against the bottom of one of the milled slots 59 and 60.

The flange member 55 is held in position prior to brazing, as aforesaid, by means of four pins 53, these pins each passing through a hole 64 in the flange member 55 and a hole 65 in one of the members 52 close to one corner of the waveguide.

Figure 5:
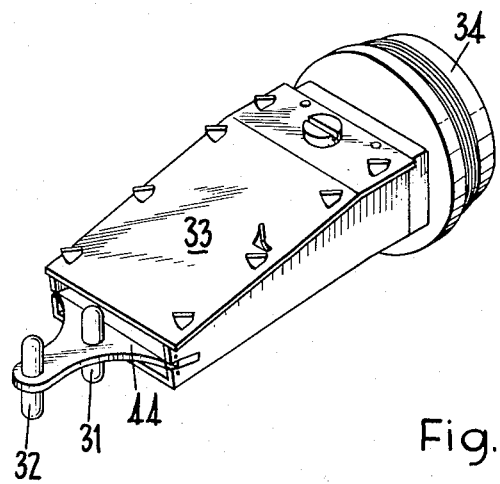
FIGURE 5 shows an isometric view of a waveguide component which is part of an aerial system and which is manufactured by the third example.

The third example in accordance with the present invention that is now to be described is the manufacture of the primary aerial assembly for an aerial system. This aerial system comprises a paraboloidal reflector and a primary aerial which is arranged to be excited by way of a co-axial line feeder which projects through the reflector. The primary aerial assembly is shown in FIGURE 5 of the accompanying drawings and comprises a pair of dipoles 31 and 32 and a tapered waveguide 33 which is provided between the dipoles and the co-axial line feeder which projects through the end member 34. During operation, the primary aerial assembly is caused to rotate about the longitudinal axis of the co-axial line feeder so that the primary aerial sweeps out an annular path about the axis of the reflector.

Figure 6:
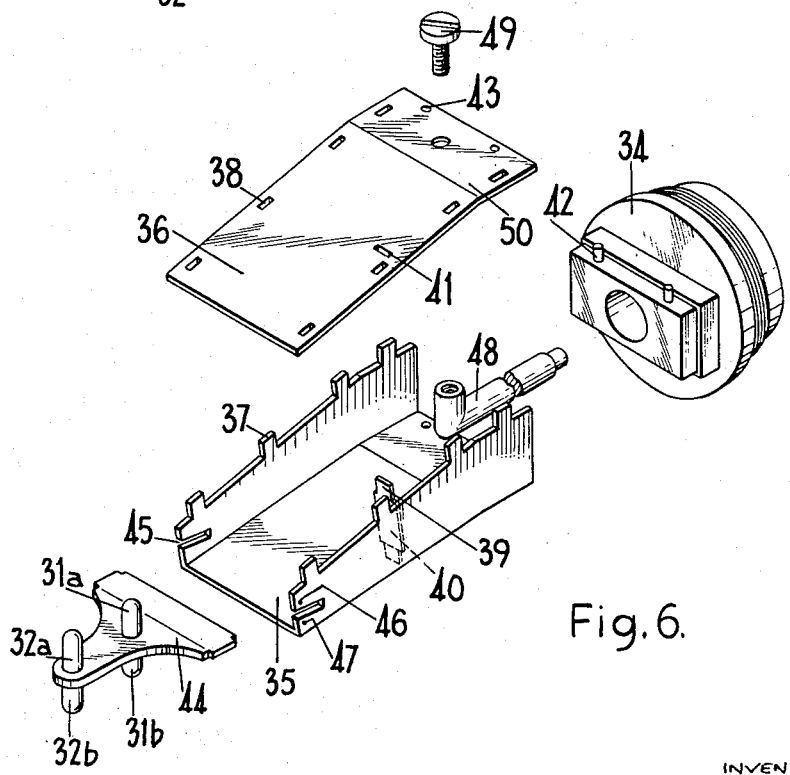
FIGURE 6 shows an exploded view of the waveguide component of FIGURE 5.

Referring now also to FIGURE 6, the waveguide 33 is made up from two members 35 and 36 which are shaped as shown in FIGURE 6, both these members being formed from sheet material. On assembly the tags 37 of the member 35 project through the holes 38 of the member 36 while the end tags 39 of a member 40 which constitutes an iris in the finished waveguide project through holes such as the hole 41 in the member 36. Prior to assembling the members 35 and 36 in this manner, the end member 34, with the member 48 projecting through it, is placed in position so that the four pegs 42 (of which only two can be seen in FIGURE 6) fit into corresponding holes such as the holes 43 in the members 35 and 36. The tags 37 and 39 are then twisted through approximately 45° so as to lock together the members 34, 35, 36 and 40.

The dipoles 31 and 32 are mounted on a member 44 as a sub-assembly. In fact the dipole 31, for example, is formed by two members 31a and 31b, one of these members being provided with a threaded portion (not shown) which passes through a hole in the member 44 and which is screwed into a threaded hole in the other member. The member 44 is fitted into the slots 45 in the sides of the member 35 and the points 46 and 47 are then centre-punched so as to deform the member 35 and thereby hold the member 44 in position.

As previously mentioned, the member 48 is placed so that it projects through the end member 34 before the member 34 is secured to the members 35 and 36. Subsequently the member 48 is held in position by means of the screw 49 which passes into it.

In this example the members 35 and 36 are of the material sold by Imperial Chemical Industries Ltd. under the trade name "Kynal" with the Code No. 1B 16/19 while the end member 34 and the member 48 are of an aluminium-magnesium-silicon alloy such as that specified in British Standard Specification No. 1476 as HE9. The members 31a and b, 32a and b and 40 are of commercially pure aluminium and the member 44 is of an aluminium-manganese alloy such as that specified in British Standard Specification No. 1470 as NS3. Alternatively the members 31a and b and 32a and b may be of the previously mentioned aluminium-magnesium-silicon alloy.

The resultant structure is subjected to cleaning and brazing in the manner described above in connection with the first example. In order to effect a good braze between the member 44 and each of the members 31a and b and 32a and b, there is preferably provided a washer of brazing foil under each of these four members prior to its being screwed into position.

To assist matching of the co-axial feeder the planar portion 50 of the member 36 may be shaped prior to assembly to provide a transverse ridge projecting into the waveguide.

An improvement of the dynamic balance of the component which, it will be appreciated, rotates during use may be effected by forming the member 36 from rather thicker sheet material than the member 35. This improvement in dynamic balance reduces the additional masses that have to be added to effect complete balance.

A further modification in the manufacture of this component is that the member 48 instead of being secured to the member 36 by the screw 49 may, during assembly, merely fit into a hole in the portion 50 of the member 36. The member 48 is then held in position during brazing by a plug which fits into the open side of the end member 34 (this side not being visible in the drawing), the plug being removed after brazing.

In each of the examples described above the waveguide structure is locked together prior to brazing by twisting tags such as the tags 15 in FIGURE 2. Alternatively the required locking may be obtained by deforming the tags in other ways. For example each tag may be sheared along its length for this purpose or alternatively it may be deformed in the manner shown in FIGURE 7 of the accompanying drawings. Referring to this figure, the waveguide structure 66 is assembled in the manner previously described with tags 67 projecting through the member 68. Each tag 67 is then squeezed between two like dies (not shown) so as to provide indentations 69 on each side of the tag and at the same time slightly to flare out the tag so as to hold the member 68 in position.

Although the waveguides and waveguide components described above are of aluminium and aluminium alloys, it is to be understood that the present invention may be applied to the manufacture of waveguides and waveguide components from other materials such as steel or brass.

It will be appreciated from the above that the present invention enables waveguides of complex shape and waveguide components to be manufactured without requiring any jigs to hold together the various members that form the waveguides. Moreover the particular form of brazing used in the examples ensures that a good metal joint is obtained between contiguous members even though the joint is not directly accessible and could not have been produced in any other manner.

It will also be realised that the present invention enables the unitary structure that is built up and subsequently brazed, as previously described, to include two or more waveguide components. Thus if two waveguide couplers, each similar to that described above with reference to FIGURES 1 and 2, are required to be connected together and to be disposed so that the longitudinal axes of all the waveguides thereof lie in a single plane, the complete waveguide structure may be built up in the manner previously described between two planar members, which correspond to the members 5 and 6 in FIGURES 1 and 2 and which are common to both the couplers.

A waveguide component manufactured in accordance with the present invention may require some further parts to be added and/or some machining to be effected after brazing. Thus if a length of waveguide in a waveguide structure, which may include other waveguide components, is required to act as a variable attenuator, a rectangular hole may be left in one of the waveguide walls. After brazing, as aforesaid, this hole may be filled by a rectangular block of metal which is soldered or screwed in position, this block of metal supporting a resistive card and being provided with means to change the position of the card within the waveguide for the purpose of varying the attenuation presented thereby.

The term "edge portion" which appears in the appended claims has the meaning which would be ascribed thereto if each of its component words were given its dictionary meaning, that is to say, the term denotes a portion of a member at a discontinuity thereof, it being understood that a discontinuity occurs either at a side edge of a member or at an edge of an opening in a member.

I claim:
1. A method of manufacturing a waveguide of rectangular cross-section, said method comprising the steps of: providing a first pair of metal members which form two opposite walls of the finished waveguide and each of which has certain tabs of rectangular cross-section projecting from two opposite edges thereof in a predetermined pattern, providing a second pair of metal members which form the other two walls of the finished waveguide and each of which has holes passing therethrough, there being one hole for each and every of said certain tabs, said holes being of substantially the same rectangular size and shape as the rectangular size and shape of the said certain tabs and being spaced and arranged to accommodate the said certain tabs projecting from the first pair of members, and at least one of the two members forming each two adjoining walls of the finished waveguide being of a material having a base of a first metallic substance and a coating on at least one side of the base of a second metallic substance that has a lower melting point than the first metallic substance, fitting together the first and second pairs of members so that the said certain tabs are inserted into and pass outwardly through and project from the correspondingly sized and shaped and located holes and so that said certain tabs and holes as well as the first pair of members and second pair of members are in contacting relationship along substantially all the adjacent portions thereof, deforming the projecting portions of the said certain tabs to lock together the first and second pairs of members, and heating the first and second pairs of members so as to cause the second metallic substance to flow and provide molten metal bridging the seams between the adjoining members and between the holes and associated certain tabs so that on cooling the members are brazed together.

2. A method as set forth in claim 1 wherein the metal wall members that are locked together constitute the entire structure that is subjected to brazing.

3. A method as set forth in claim 1 wherein prior to heating for brazing at least one additional metal member is secured to the metal wall members that are locked together.

4. A method as set forth in claim 3 wherein the additional metal member forms a flange in the finished waveguide.

5. A method as set forth in claim 1 wherein the two pairs of metal members are formed from sheet material.

6. A method as set forth in claim 5 wherein the longitudinal axis of the finished waveguide along at least a portion of its length is curvilinear, the second pair of members being substantially planar and the first pair of members being of arcuate shape.

7. A method as set forth in claim 1 wherein the base is an aluminum alloy and the coating is an aluminum-silicon alloy.

8. A method as set forth in claim 1 wherein the structure that is subjected to brazing includes at least one additional member that is not of either of said substances.

9. A method as set forth in claim 1 wherein the heating is effected with the structure immersed in a bath of brazing flux.

10. A method of manufacturing two integrated waveguides each of which is of rectangular cross-section and which waveguides have a common wall, said method comprising the steps of: providing a first pair of metal members which form the walls of the two finished waveguides which are respectively opposite to the common wall of the finished waveguides and each of which metal members has certain tabs of rectangular cross-section projecting from two opposite edges thereof in a predetermined pattern, providing a single metal member which in the finished waveguides forms the common wall, said single metal member also having certain tabs of rectangular cross-section projecting from the opposite edges thereof in a predetermined pattern, providing a second pair of metal members which form the remaining opposite walls of both the finished waveguides and each of which has holes passing therethrough, there being one hole for each and every of said certain tabs, said holes being of substantially the same rectangular size and shape as the rectangular size and shape of the said certain tabs and being spaced and arranged to accommodate the said certain tabs projecting from the first pair of members and from the single member, and at least one of the two members forming each two adjoining walls of each of the finished waveguides being of a material having a base of a first metallic substance and a coating on at least one side of the base of a second metallic substance that has a lower melting point than the first metallic substance, fitting together the first and second pairs of members and the single member so that the said certain tabs are inserted into and pass outwardly through and project from the correspondingly sized and shaped and located holes and so that said certain tabs and holes as well as the first pair of members, the single member and second pair of members are in contacting relationship along substantially all the adjacent portions thereof, deforming the projecting portions of the said certain tabs to lock together the first and second pairs of members and the single member, and heating the first and second pairs of members and the single member so as to cause the second metallic substance to flow and provide molten metal bridging the seams between the adjoining members and between the holes and associated certain tabs so that on cooling the members are brazed together.

References Cited in the file of this patent

UNITED STATES PATENTS

| | | |
|---|---|---|
| 1,918,197 | Sebell | July 11, 1933 |
| 2,215,318 | Bristol | Sept. 17, 1940 |
| 2,258,681 | Hoglund | Oct. 14, 1941 |
| 2,322,845 | Goldsworthy | June 29, 1943 |
| 2,505,424 | Moseley | Apr. 25, 1950 |

FOREIGN PATENTS

| | | |
|---|---|---|
| 468,907 | Great Britain | July 15, 1937 |
| 915,062 | France | Oct. 25, 1946 |
| 958,151 | France | Mar. 3, 1950 |